Figure 1:
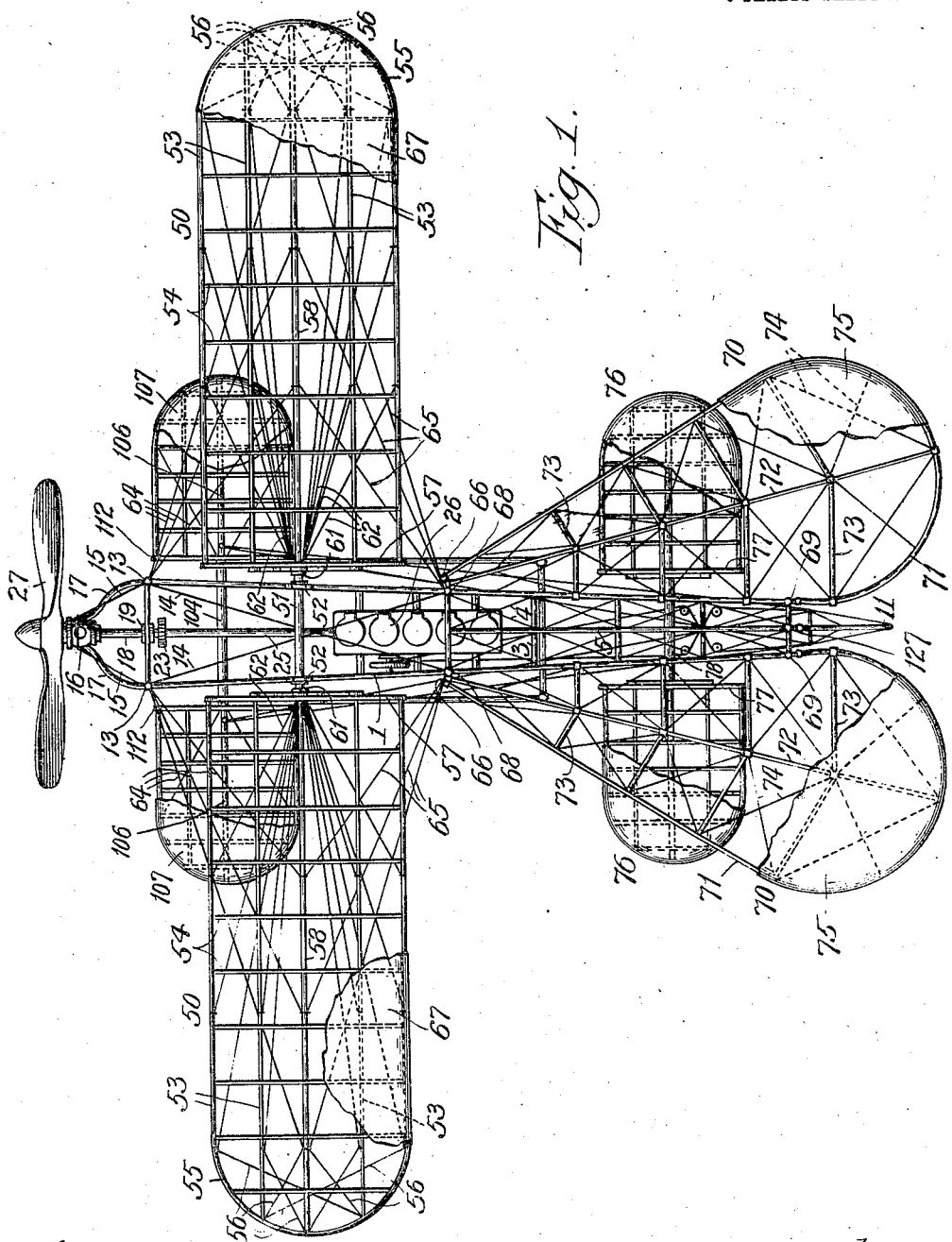

H. O. LAWRENCE.
FLYING MACHINE.
APPLICATION FILED MAR. 6, 1911. RENEWED APR. 28, 1913.

1,084,552.

Patented Jan. 13, 1914.
6 SHEETS—SHEET 1.

H. O. LAWRENCE.
FLYING MACHINE.
APPLICATION FILED MAR. 6, 1911. RENEWED APR. 28, 1913.
1,084,552.
Patented Jan. 13, 1914.
6 SHEETS—SHEET 2.
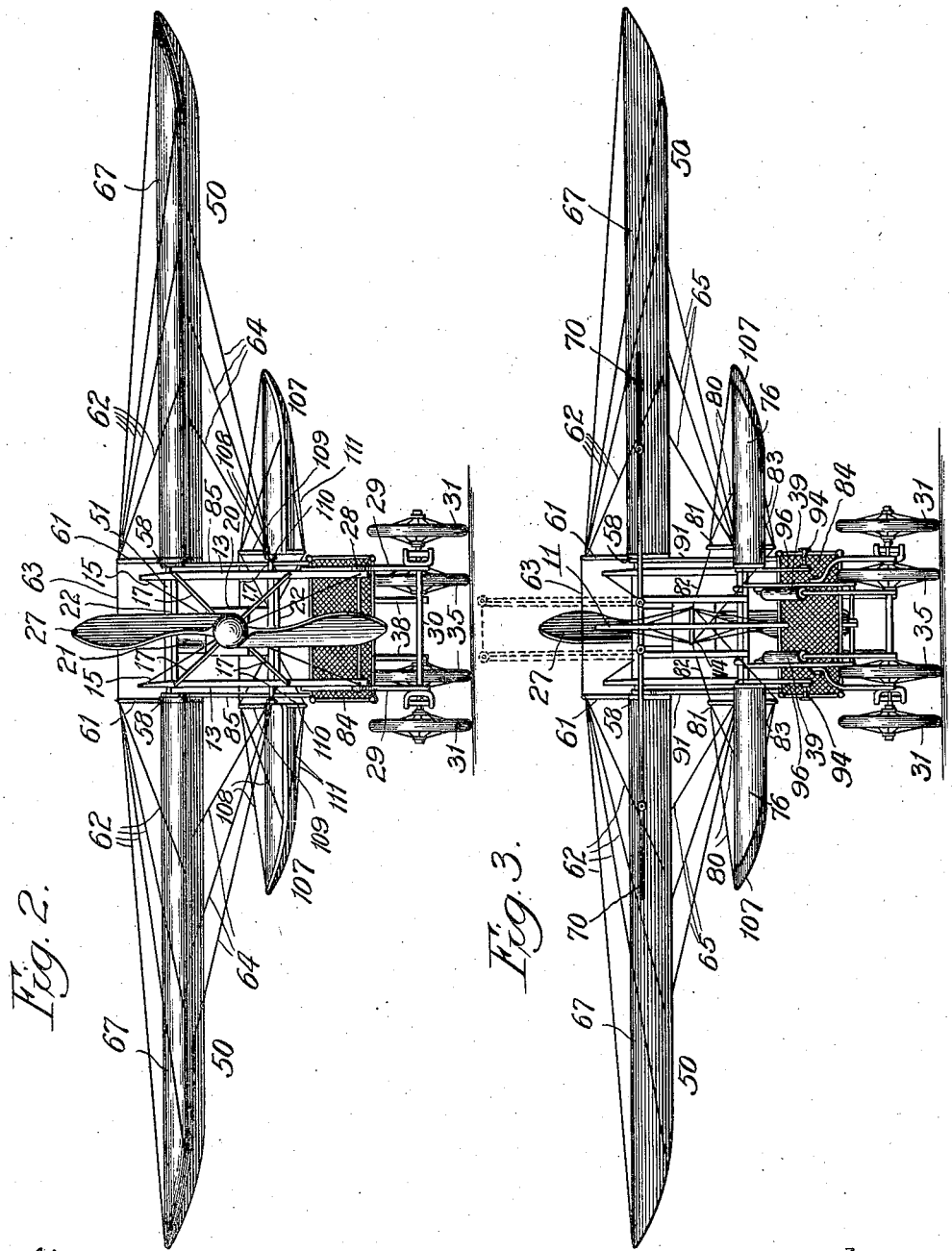

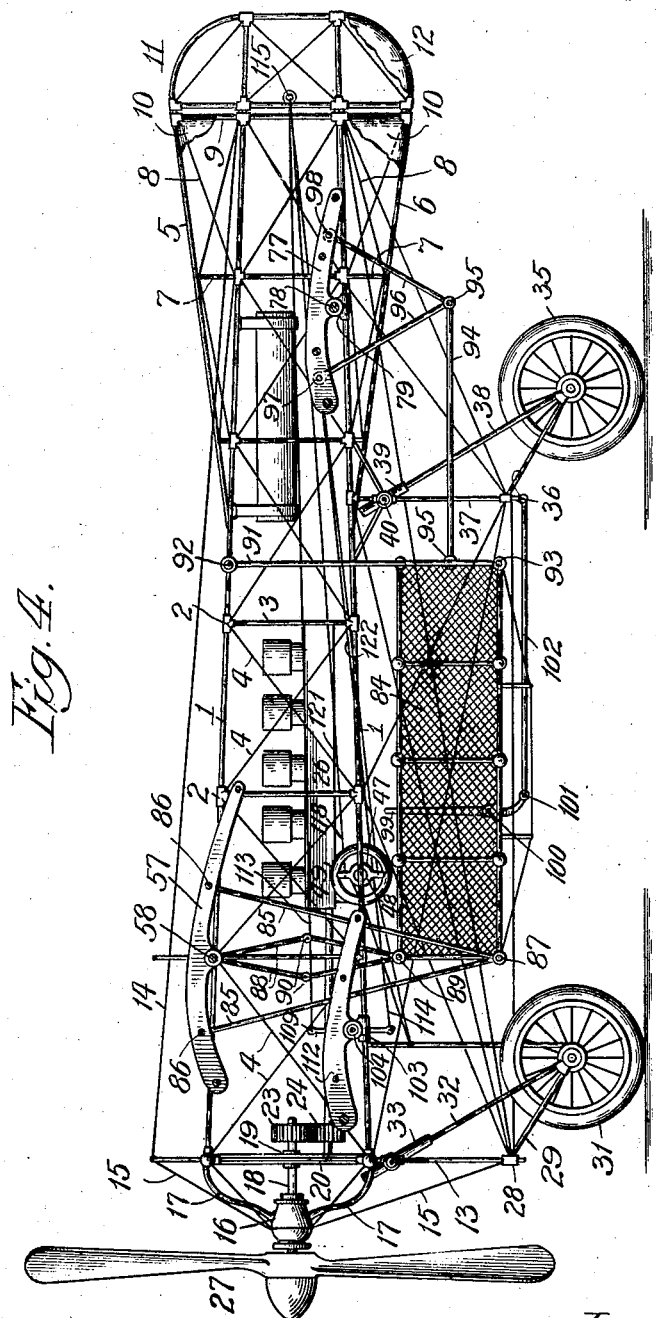

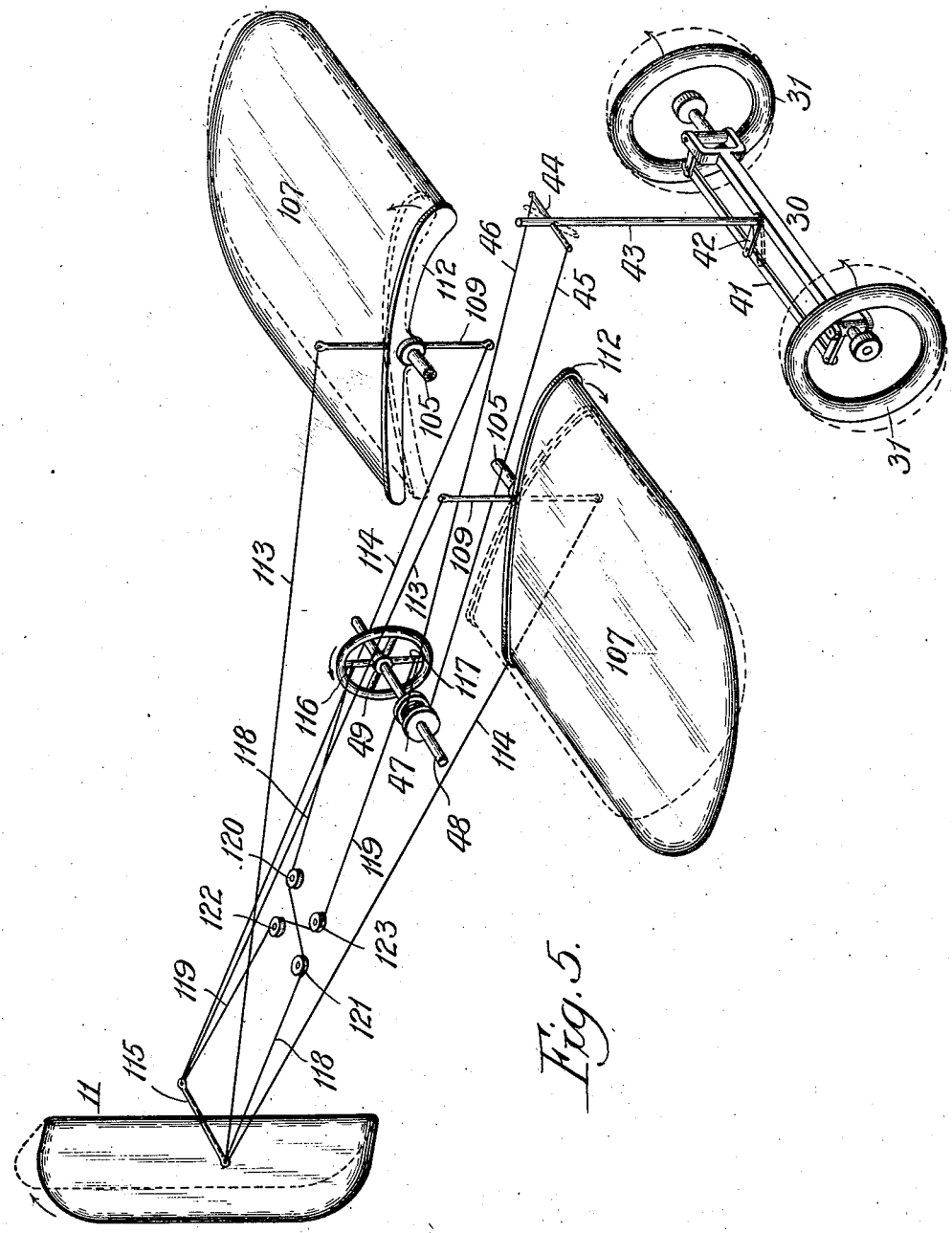

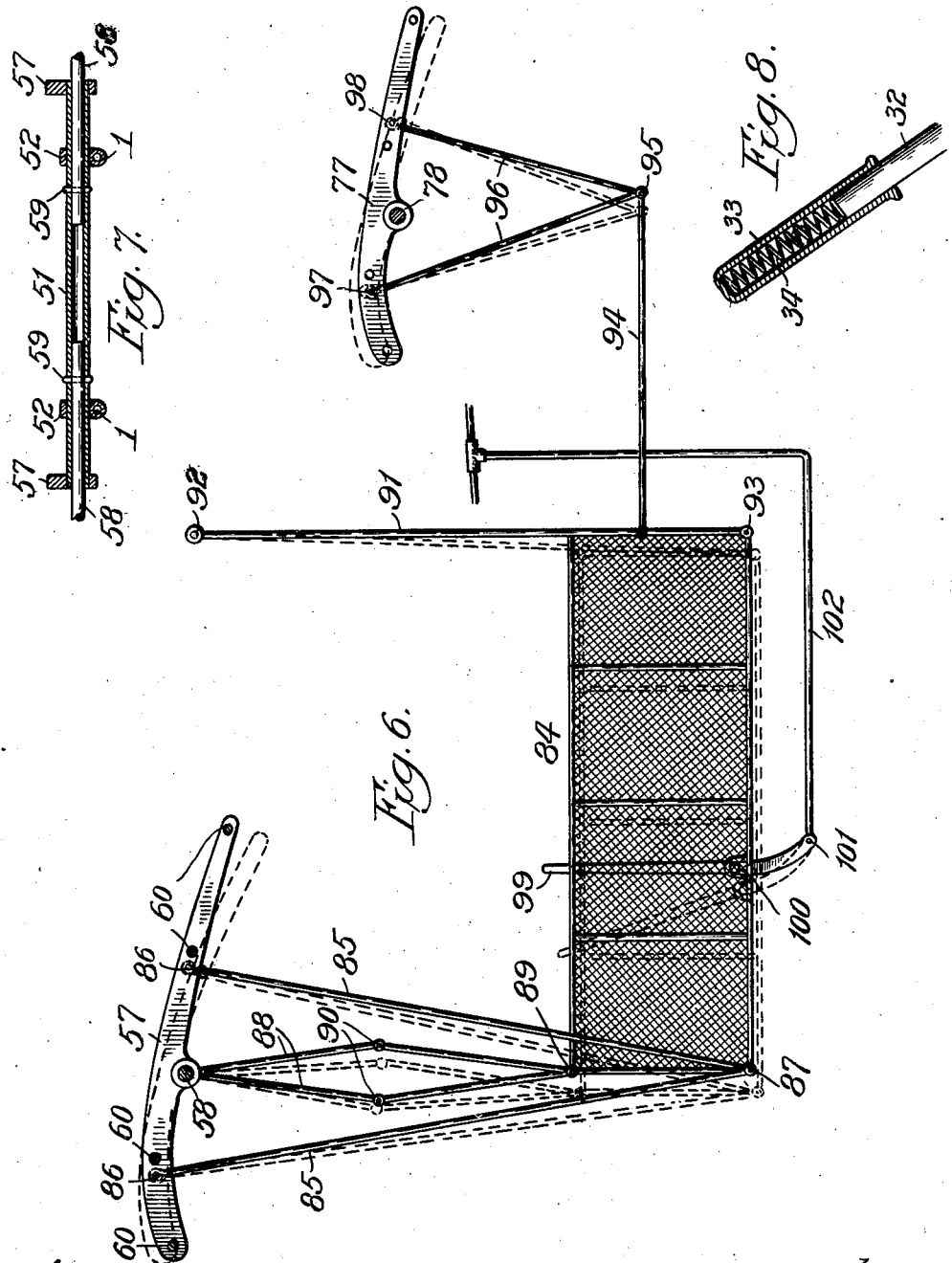

H. O. LAWRENCE.
FLYING MACHINE.
APPLICATION FILED MAR. 6, 1911. RENEWED APR. 28, 1913.
1,084,552.
Patented Jan. 13, 1914.
6 SHEETS—SHEET 6.
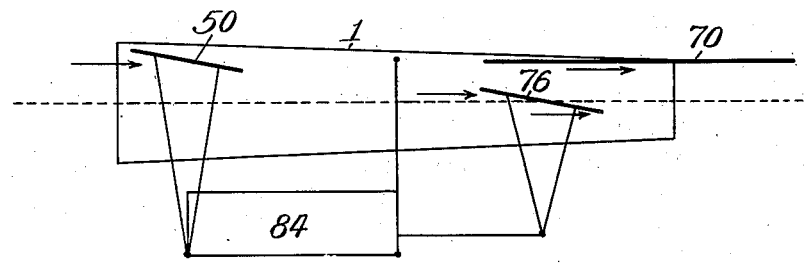
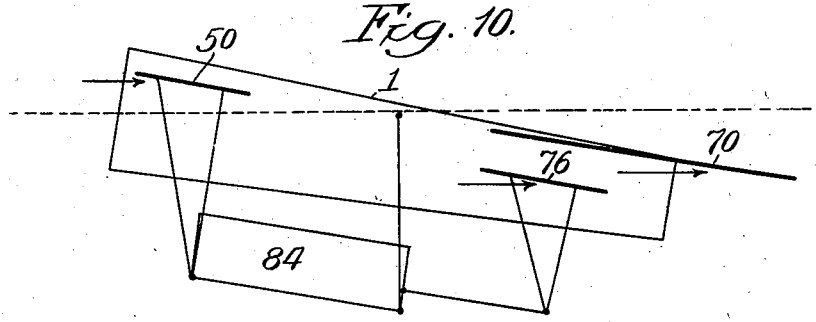
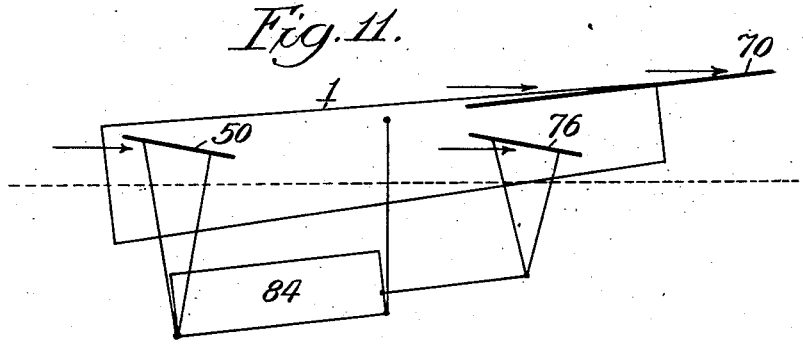

UNITED STATES PATENT OFFICE.

HARRY O. LAWRENCE, OF CHICAGO, ILLINOIS.

FLYING-MACHINE.

1,084,552.  Specification of Letters Patent.  Patented Jan. 13, 1914.

Application filed March 6, 1911, Serial No. 612,640. Renewed April 28, 1913. Serial No. 764,261.

*To all whom it may concern:*

Be it known that I, HARRY O. LAWRENCE, a citizen of the United States, residing at Chicago, in the county of Cook and State of Illinois, have invented certain new and useful Improvements in Flying-Machines, of which the following is a description, reference being had to the accompanying drawings, forming a part of this specification, in which corresponding numerals of reference in the different figures indicate like parts.

The primary object of my invention is to provide an aeroplane or flying machine which shall possess automatic stability or in other words, one in which a stable equilibrium may be maintained both laterally and longitudinally. Generally and briefly stated, I accomplish this object by means of an elongated fuselage or frame having fore and aft lateral sustaining planes pivotally mounted upon transverse horizontal axes, a suspended or swinging basket for the operator so connected to said sustaining planes that the gravity of the basket and its load may serve to normally maintain each of said planes at a predetermined angle of incidence, and special means for enabling the operator to arbitrarily vary or reverse said angle without materially shifting the position of the longitudinal axis of the frame from substantial parallelism with the plane of the horizon, so that the machine may be caused to ascend, make any desired flight and descend upon an "even keel."

Other subsidiary objects are to avoid the necessity for "warping" the wings or planes, to so construct the main supporting planes and tail that they may either be detached or so folded as to confine them within suitable limits for land transportation and to provide a proper carriage for alighting and traveling upon the ground, the propelling elements being the same in both cases, and the steering gear adapted to actuate not only the rudder, and balancing planes, but the wheels of the carriage as well.

To these ends my invention consists in the combination of elements hereinafter more particularly described and definitely pointed out in the claims.

In the drawings, Figure 1, is a plan view of a device embodying the features of the invention, the greater portion of the cover being removed from the several planes to show the construction of the parts, Fig. 2, is a front elevation of the machine as it would appear when ready for flight, Fig. 3, is a rear elevation thereof, Fig. 4, is a side elevation, as it would appear when the planes are removed, Fig. 5, is a diagrammatic view in perspective of the lateral balance planes, the rudder, the front wheels and the steering gear, Fig. 6 is a detached view in detail of the suspended basket, showing the connection of the suspending elements with the frame member of one of the main supporting planes and the manner of connecting the basket with the rear auxiliary sustaining wings, together with means for positively shifting the basket in its relation to the frame, Fig. 7, is a longitudinal vertical sectional view of the transverse shaft forming the axis of the main supporting planes, Fig. 8, is a central sectional view of one of the telescoping tubes containing the carriage springs, and Figs. 9, 10 and 11 are diagrammatic views showing the frame and sustaining planes in different relative positions caused by the shifting of the center of gravity for the purpose of illustrating the stability of the longitudinal equilibrium.

The fuselage or main frame of the machine is composed of a series of longitudinal frame members 1, provided with suitable unions 2, for the connection of struts 3 constructed in a well known manner, said frame being braced by means of diagonal tie-wires 4, the vertical and horizontal struts and braces being the same. The frame is rectangular in cross section, its height being preferably greater than its width and is tapered from front to rear as shown.

Located in the central vertical plane of the frame, are rigid frame elements comprising longitudinal bars 5 and 6, having their forward ends connected to the main frame at points preferably back of the middle and diverging therefrom upwardly and downwardly respectively, being connected therewith by means of suitable struts 7, and tie-wires 8. A vertical strut 9, at the rear end of the frame serves to connect the rear ends of said bars. A covering 10, of canvas, sheet-aluminum or other suitable material, is attached to the bars 5 and 6 and their connecting parts as described, to form vertical fins to aid in guiding and imparting stability to the structure while flying.

A rudder 11, formed from suitable skeleton frame elements properly trussed and provided with a covering 12, is jointedly connected to the bar 9 in any approved manner to permit said rudder to swing laterally upon a vertical axis. At the forward end of the frame and forming a part thereof, are vertical bars or struts 13, Figs. 1, 2 and 4, which extend above and below the main frame and are connected by means of suitable guys 14, to the rear of the frame. Guys 15, serve also to connect the ends of said members to a bearing member or head 16, which is rigidly attached to the converging ends of arms 17, the rear ends of which are attached to said frame. A propeller shaft 18 has its forward end mounted in the bearing 16 and its rear end in a bearing 19, attached to a supporting element 20, Fig. 2, rigidly attached to vertical bars 21, the ends of which are in turn secured to cross-bars 22. A gear wheel 23, upon the rear end of the shaft 18, is in mesh with a like gear wheel 24, Fig. 4, upon a main driving shaft 25, the forward end of which is journaled in a bearing in the part 20, while the rear end is in operative connection with a motor 26, of any well known type, supported in the main frame. The usual type of screw-propeller 27, is attached to the forward end of the shaft 18.

The frame is mounted upon a carriage in the following manner: Swiveled at 28, Figs. 2 and 4, to the lower end of each of the members 13, is a rearwardly and downwardly extended bar 29, which is jointedly connected to the forward axle 30, of a carriage, which axle is jointed in the usual way to provide for steering the front wheels 31. Upwardly and forwardly extended bars 32, Fig. 4, are arranged to telescope with tubes 33 which, in turn, are swiveled upon the bars 13. Coiled springs 34, Fig. 8, are inserted in the tubes 33, to cushion the bars 32, which sustain the load. The rear wheels 35 are supported in like manner by means of bars 36 attached to vertical frame members 37 and bars 38 arranged to telescope with tubes 39 attached at 40 to said frame member. Cushioning springs corresponding to the springs 34, Fig. 8, are located in the tubes 39 for a like purpose.

The front axle is connected in a well known way with the usual steering bar 41, Fig. 5, which is jointedly connected to the free end of an arm 42, rigidly attached to the lower end of a vertical steering post 43, having a cross-bar or yoke 44, near its upper end, the opposite ends of which are connected by means of steering cords 45, 46, to a drum 47, mounted upon a shaft 48, which is journaled in bearings in the frame. A hand-wheel 49, also shown in Fig. 4, is mounted upon said shaft for operating it to steer the carriage when on the ground and the machine when in flight as hereinafter described.

Main sustaining planes, generally designated by 50, are secured to the forward part of the frame and extended laterally therefrom in the following described manner. A hollow shaft or tubular member 51, Figs. 1, 2 and 7, is, by preference, journaled in bearings 52, which are rigidly attached to the upper frame elements 1, the length of said shaft being greater than the width of the frame. The planes 50 are composed of main ribs 53, Fig. 1, and short ribs 54 arranged at right angles thereto and rigidly connected to each other. The outer ends of the main ribs are attached to a rim 55, preferably curved as shown, the parts being stiffened by means of diagonal tie rods or cords 56. The inner ends of the main ribs of each of said planes are detachably connected to bars 57, Figs. 1, 4, 6 and 7, which are located near to and upon opposite sides of the main frame and rigidly attached to the opposite ends of the shaft 51, which forms a pivotal support therefor. The central rib 58, of each of the planes 50, is longer than its fellows and is extended into the tubular shaft 51, in the manner shown in Fig. 7, in which it is detachably secured by means of a pin 59. The inner ends of the other ribs 53 are fitted in bores 60, Fig. 6, in the bars 57, and rigidly secured by means of pins or otherwise to enable them to be detached.

Struts 61, better shown in Figs. 1, 2 and 3, are extended upwardly from the shaft 51 or from the bars 57 in vertical alinement with said shaft as may be preferred, and serve as supports for the upper guys 62, of the main planes which center at said points as represented in Figs. 1, 2 and 3, and diverge therefrom to points as shown upon the several long ribs and upon the rims of the planes. The converging ends of said top guys are connected to a common tie rod or cord 63, which is extended between the struts 61. Lower guys 64 are anchored at or near the front end of the frame and are connected at various points as shown with the central ribs 58 of said planes. Similar guys 65, Figs. 1 and 3, are connected to the lower portion of the frame about midway between its ends as shown at 66.

It will be apparent from the foregoing that the planes 50, while properly guyed and braced are free to oscillate upon an axis represented by the main ribs 58 and shaft 51. The frames of said planes are provided with a covering 67 of canvas or other suitable material. Jointedly connected at 68 and 69 to the upper frame members 1, are horizontally and laterally extended rear sustaining planes generally designated by 70. Other intermediate jointed connections are intended to be made in like manner but have not been designated by numerals. These planes which comprise a tail, are intended to be rigidly maintained in a fixed relation to the frame when in flight and hence may be permanently attached and made rigid throughout or they may be made foldable. Each plane consists of marginal frame pieces 71, one or more longitudinal ribs 72, short ribs or struts 73, diagonal tie cords 74, and a covering 75 of any suitable fabric or material.

Located beneath the tail planes 70, about midway between the ends thereof, are auxiliary rear sustaining wings or planes generally designated by 76. These planes are provided with long and short ribs as shown in Fig. 1 and a cover as represented in Fig. 3, and differ in construction from the planes 50 only in relative size. Bars 77, Figs. 1, 4 and 6 to which the inner ends of the long ribs of the planes 76 are attached, are arranged parallel to each other upon opposite sides of the frame and pivotally mounted upon a transverse shaft 78 having bearings 79, Fig. 4, preferably upon the lower longitudinal frame members. It will thus be seen that said planes are adapted to be oscillated in unison upon a common axis, being stiffened and sustained in place by means of upper guys 80, which are extended from the rims to central struts 81, from whence they are connected by means of cords 82. Lower guys 83 are extended from the central ribs to the frame.

A basket or car 84, preferably elongated, is located beneath the frame and suspended at or near its forward end by means of rods 85, better shown in Figs. 4 and 6, which are by preference attached to the bars 57 at 86 and pivotally connected to the basket frame, preferably at the bottom, as shown at 87. Said basket is provided with a suitable floor to permit the operator to stand within it and is enough wider than the frame so that the operator when standing upon one side may be free to examine the engine. Emergency suspension rods 88, are jointedly connected at their upper ends to the shaft 58, while their lower ends are jointedly connected at 89 to the top of the basket. Said rods are intended merely as factors of safety in case of the breakage of one or more of the rods 85, and are normally inert, being provided with joints 90 so as not to interfere with the normal longitudinal swinging action of the rods 85 upon different centers. The rear end of the basket 84, is suspended by means of rods 91, jointedly connected at 92, to the upper part of the frame and at 93 to the lower part of the basket. The length of the forward and aft suspending members should be substantially equal in order to insure parallelism between the frame and the car. Horizontal rods 94 are jointedly connected at 95 to the lower ends of upwardly diverging rods or arms 96, the upper ends of which are attached at 97 and 98 respectively to the bars 77. This construction permits the basket to be swung longitudinally beneath the main frame in the manner indicated in Fig. 6 which movement causes the main planes 50 and the auxiliary planes 76 to oscillate in unison upon their respective axes. The rods 85 should be so proportioned and adjusted in their relation to the bars 57 as to produce such an angle of traction of the planes 50 with the direction of power as to cause the normal flight of the machine to be substantially horizontal. This principle should also apply to the adjustment of the connections between the basket and the rear sustaining planes.

A lever 99, is fulcrumed at 100 upon a suitable bracket attached to the bottom of the basket. Said lever is extended below the bottom of the bracket and jointedly connected at 101 to a link 102, which is extended forwardly from the lower end of the frame element 37. This connection between the rigid frame and the suspended basket enables the operator to stand in the latter and upon moving the lever forward or back, to tilt the planes 50 and 76 in unison for the purpose of rising or descending as hereinafter described. The three sets of planes mentioned pertain only to the ascent and descent of the machine, the sustaining thereof, and to the steadying of its movement while in flight. In addition to these features, I provide lateral balance planes which are intended to be actuated in harmony with the movement of the rudder to enable the course of the machine to be changed.

Secured in fittings 103, Fig. 4, attached to the lower frame members near the forward end, is a transverse hollow shaft 104, also shown in Fig. 1, into which is journaled the rounded ends 105, Fig. 5, of central longitudinal ribs 106, Fig. 1, of lateral balance planes generally designated by 107. Said planes are identical in construction with the planes 76, including rims, ribs and cover and are provided with similar guys 108 stretched over struts 109 and connected with an intermediate tie 110, Fig. 2. Lower guys 111, serve also to connect the central ribs with the frame. The inner ends of the main ribs of said planes are rigidly connected to bars 112 and are free to oscillate independently of each other upon a common axis. The struts 109 constitute vertical tiller bars or yokes, the opposite ends of which are connected by means of tiller ropes 113, 114, Figs. 4 and 5, to the opposite ends of a yoke 115 upon the rudder 11, or in other words the upper end of the yoke 109, upon the left hand plane, is connected with the right hand end of the yoke 115 and its lower end is connected with the left hand end of said yoke while the upper end of the yoke 109 upon the right-hand plane, is connected with the left hand and its lower end to the right-hand end of said yoke 115.

Connected at 116 and 117 respectively to spokes or other parts diametrically opposite to each other upon the hand-wheel 47, are tiller cords 118, 119, which are preferably crossed and trained upon eaves 120, 121, and 122, 123, and connected in turn to the opposite ends of the tiller yoke 115. It will thus be seen that by actuating the handwheel the rudder may be moved laterally in either direction, to steer the machine while simultaneously the lateral balance planes 76 are caused to tilt in opposite directions to the requisite degree to insure stability, it being understood that the yoke upon the rudder and those upon the planes should be so proportioned with respect to each other that a given movement of the rudder will cause but a relatively slight movement of the planes.

The operation of the device is as follows: The operator standing in the basket starts the motor and moves the lever 99 forward as indicated in dotted lines in Fig. 6, which results in causing the bars 57 and 77 and with them the respective fore and aft lifting planes, to be tilted to the respective positions as indicated in dotted lines, thereby causing the machine to rise with the axis of the frame in a substantially horizontal plane. Upon attaining the desired height the lever is released and immediately resumes its normal position as does also the basket in its relation to the frame, as indicated in full lines in Fig. 6. This also causes the sustaining planes to be returned to their respective normal positions. The tail planes 70 serve to steady the rear portion of the machine when in flight and inasmuch as the basket 84 is suspended beneath the frame, free to swing longitudinally, the machine will tend to balance itself and to move forward upon a substantially even keel as indicated in Fig. 9. Should the operator move to the rear end of the basket, thereby shifting the center of gravity, the immediate tendency would be to depress the rear end of the frame as indicated in Fig. 10; but inasmuch as the basket is suspended at front and rear, its body would remain parallel with the frame while the axes of the suspending elements would be vertical so that the angle of incidence of the sustaining planes would remain constant. The depression of the rear part of the frame would cause the tail planes 70 to be inclined accordingly but the impingement of the air currents upon the under surfaces thereof would at once tend to counteract the shifting of the center of gravity and the body of the machine would immediately be righted. Should the operator shift to the front of the basket, the tendency would be to depress the forward end of the frame as indicated in Fig. 11, while the angle of incidence of the lifting planes would not be varied. Instantly, however, the impingement of the air currents would be shifted to the upper surface of the inclined tail and the machine would again tend to right itself and would continue to move with the axis of the body in a substantially horizontal plane.

From the foregoing it will be seen that in view of the fact that the angle of incidence of the fore and aft lifting planes is at all times independent of the longitudinal tilting of the frame, the center of buoyancy must remain substantially constant. This is also true of the machine when considered in relation to its transverse axis, for in both cases the metacentric height is sufficient to insure automatic stability.

In steering the machine the movement of the hand-wheel serves simultaneously, through the connections described, to actuate the rudder, to move the lateral balance planes in opposite directions and to actuate the steering gear of the carriage as well. This feature is especially important in case it is desirable to avoid obstructions in landing when the several parts coact to produce a desired result.

I do not wish to be limited to the exact construction shown and especially to the manner of connecting the suspended car with the sustaining planes as it is obvious that any jointed connection between the car and the sustaining planes that will serve to normally hold the latter at a constant angle to the plane of the vertical while permitting the longitudinal axis of the car to normally maintain parallelism with that of the frame, would be the equivalent of that shown.

Having thus described my invention, what I claim and desire to secure by Letters Patent is:—

1. In a machine of the class described, the combination of a central elongated frame, propelling means mounted thereon, fore and aft sustaining planes axially mounted upon said frame upon transverse axes, a car suspended beneath said frame upon fore and aft suspending members adapted to hang vertically from their respective points of support when the frame is tilted longitudinally, means for connecting said car to said sustaining planes to normally hold the latter at predetermined angles of incidence and means for arbitrarily shifting said car forward or back with respect to said frame to vary the angle of incidence of the sustaining planes.

2. In an aeroplane, the combination of a central frame, a motor, a propeller, fore and aft sustaining planes axially mounted upon said frame upon transverse axes, said aft sustaining planes having a lesser area and being located at a lower level than that of the forward ones, lateral tail planes located above said aft sustaining planes, a car suspended beneath said frame upon fore and aft jointedly connected suspending members, and means for connecting said car to said sustaining planes to transmit axial movement to the latter as the car is shifted forwardly or backwardly in its relation to the frame.

3. In a machine of the class described, the combination of a central elongated frame, propelling means mounted thereon, fore and aft sustaining planes axially mounted upon said frame upon transverse axes, a car suspended beneath said frame upon fore and aft pivoted suspending members adapted to hang vertically from their respective points of support, means for connecting said car to said sustaining planes to normally hold the latter at predetermined angles of incidence, a lever pivotally connected to said car and means for connecting said lever with said frame whereby the position of the car with respect to that of the frame may be arbitrarily shifted.

4. In a flying machine, the combination of a frame, the longitudinal axis of which is in the direction of its movement, forward and aft lateral sustaining planes axially mounted thereon, a car having pivoted suspending members, one upon each side thereof at opposite ends, said forward suspending members having their upper ends rigidly connected to said forward planes and their lower ends jointedly connected to said car, while said rear suspending members have both ends pivotally connected, one to said frame and the other to the car and means for connecting said car to said aft sustaining planes.

5. In a flying machine, the combination of a frame, the longitudinal axis of which is in the direction of its movement, forward and aft sustaining planes axially mounted thereon, a car, divergent suspending rods having their upper ends connected to said forward sustaining planes upon opposite sides of the axis of said planes while their lower ends are jointedly connected at a common point to said car, rear suspending members having opposite ends pivotally connected one to said frame and the other to the car, depending arms rigidly connected to said aft sustaining planes and means for connecting the lower ends of said arms to said car.

6. A flying machine having a frame, the longitudinal axis of which is in the direction of its movement, forward, laterally extended sustaining planes pivotally mounted upon a transverse axis, a car suspended to swing beneath said frame upon forward and aft suspending members to cause said car to maintain substantial parallelism with the longitudinal axis of said frame and means for connecting the forward suspending members of said car with said forward sustaining planes to cause said car to swing in unison therewith.

7. A flying machine having a frame, the longitudinal axis of which is in the direction of its movement, forward, laterally extended sustaining planes pivotally mounted upon the frame upon a transverse axis, a car having its forward end suspended from said axis while its rear end is pivotally suspended from the frame, means for causing said car and forward sustaining planes to move in unison and means interposed between the car and frame for arbitrarily shifting the position of the car with respect to that of the frame.

8. A flying machine having a frame, the longitudinal axis of which is in the direction of its movement, forward and aft sustaining planes, said forward planes being pivotally mounted upon the frame upon a transverse axis, a car having its forward end suspended from said axis while its rear end is pivotally suspended from the frame, the forward and rear suspending members being jointedly connected to the car, means for rigidly connecting the forward suspending members to said forward planes to cause said planes and forward suspending members to swing in unison upon a common axis, means interposed between said car and frame for arbitrarily shifting the position of one with respect to the other and means for locking said shifting means to temporarily hold said car and frame in abnormal relation to each other.

9. A flying machine having a frame, the longitudinal axis of which is in the direction of its movement, forward, laterally extended sustaining planes pivotally mounted upon a transverse axis, a car having suspending members upon opposite sides thereof at front and rear, the forward suspending members being rigidly connected to said forward sustaining planes and jointedly connected to the car, the axis of said planes forming the axial support for said forward suspending members, while said rear suspending members are jointedly connected to said frame and car.

In testimony whereof, I have signed this specification in the presence of two subscribing witnesses, this third day of March 1911.

HARRY O. LAWRENCE.

Witnesses:
 DAVID H. FLETCHER,
 JENNIE L. FISKE.